(12) United States Patent
Chung et al.

(10) Patent No.: US 7,680,658 B2
(45) Date of Patent: Mar. 16, 2010

(54) METHOD AND APPARATUS FOR SPEECH RECOGNITION

(75) Inventors: Seung-nyung Chung, Seoul (KR); Myung-hyun Yoo, Gyeonggi-do (KR); Jay-woo Kim, Gyeonggi-do (KR); Joon-ah Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1804 days.

(21) Appl. No.: 10/748,105

(22) Filed: Dec. 31, 2003

(65) Prior Publication Data

US 2004/0153321 A1 Aug. 5, 2004

(30) Foreign Application Priority Data

Dec. 31, 2002 (KR) .................. 10-2002-0087943

(51) Int. Cl.
 *G10L 15/26* (2006.01)
(52) U.S. Cl. .................. 704/235; 704/231; 704/236
(58) Field of Classification Search .................. 704/235, 704/252, 231, 239, 240, 244, 246, 270, 270.1, 704/275, 10, 243, 245, 9, 236, 276; 715/711
See application file for complete search history.

(56) References Cited

U.S. PATENT DOCUMENTS

| 4,866,778 | A |   | 9/1989  | Baker ..................... 381/43 |
| 5,027,406 | A |   | 6/1991  | Roberts et al. |
| 5,329,609 | A |   | 7/1994  | Sanada et al. ............. 395/2.6 |
| 5,754,176 | A | * | 5/1998  | Crawford .................. 715/711 |
| 5,829,000 | A | * | 10/1998 | Huang et al. ............... 704/252 |
| 5,864,805 | A | * | 1/1999  | Chen et al. ................. 704/235 |
| 5,884,258 | A |   | 3/1999  | Rozak et al. |
| 5,909,667 | A | * | 6/1999  | Leontiades et al. .......... 704/275 |
| 6,314,397 | B1 |   | 11/2001 | Lewis et al. |
| 6,347,296 | B1 |   | 2/2002  | Friedland |
| 6,839,667 | B2 | * | 1/2005  | Reich ..................... 704/240 |
| 2002/0143544 | A1 |   | 10/2002 | Gschwendtner .......... 704/260 |

(Continued)

FOREIGN PATENT DOCUMENTS

EP 0 526 347 2/1993

(Continued)

OTHER PUBLICATIONS

Chen et al., "An N-Best Candidates-Based Discriminative Training for Speech Recognition Applications," IEEE Transactions on Speech and Audio Processing, vol. 2, No. 1, pp. 206-216, Jan. 1994.

(Continued)

*Primary Examiner*—Huyen X. Vo (57) ABSTRACT

A method and apparatus for enhancing the performance of speech recognition by adaptively changing a process of determining the final, recognized word depending on a user's selection in a list of alternative words represented by a result of speech recognition. A speech recognition method comprising: inputting speech uttered by a user; recognizing the input speech and creating a predetermined number of alternative words to be recognized in the order of similarity; and displaying a list of alternative words arranged in a predetermined order and determining an alternative word that a cursor currently indicates as the final, recognized word if a user's selection from the list of alternative words has not been changed within a predetermined standby time.

29 Claims, 9 Drawing Sheets

U.S. PATENT DOCUMENTS

2003/0191629 A1 * 10/2003 Yoshizawa ................... 704/10

FOREIGN PATENT DOCUMENTS

| EP | 0 697 780 | 2/1996 |
|---|---|---|
| KR | 2000-0047589 | 7/2000 |
| KR | 2001-0098262 | 11/2001 |
| WO | WO 01/75555 | 10/2001 |

OTHER PUBLICATIONS

An N-Best Candidates-Based Discriminative Training for Speech Recognition Applications, Chen et al., IEEE Transactions on Speech and Audio Processing, vol. 2, No. 1, pp. 206-216, Jan. 2004.

* cited by examiner

| 41 | 42 | 43 | | | 44 | 45 |
|---|---|---|---|---|---|---|
| FIRST ALTERNATIVE WORD RESULTING FROM SPEECH RECOGNITION | FINAL, RECOGNIZED WORD | FIRST UTTERANCE FEATURE | ... | $n^{th}$ UTTERANCE FEATURE | UTTERANCE PROPENSITY | HISTORY(n) |
| HWANG GIL DU | HONG GIL DONG | XX | XX | XX | XX | 3 |

METHOD AND APPARATUS FOR SPEECH RECOGNITION

CROSS-REFERENCE TO RELATED APPLICATIONS

This application claims the priority of Korean Patent Application No. 2002-87943, filed on Dec. 31, 2002, in the Korean Intellectual Property Office, the disclosure of which is incorporated herein in its entirety by reference.

BACKGROUND OF THE INVENTION

1. Field of the Invention

The present invention relates to speech recognition, and more particularly, to a method and apparatus for enhancing the performance of speech recognition by adaptively changing a process of determining a final, recognized word depending on a user's selection in a list of alternative words represented by a result of speech recognition.

2. Description of the Related Art

Speech recognition refers to a technique by which a computer analyzes and recognizes or understands human speech. Human speech sounds have specific frequencies according to the shape of a human mouth and positions of a human tongue during utterance. In other words, in speech recognition technology, human speech sounds are converted into electric signals and frequency characteristics of the speech sounds are extracted from the electric signals, in order to recognize human utterances. Such speech recognition technology is adopted in a wide variety of fields such as telephone dialing, control of electronic toys, language learning, control of electric home appliances, and so forth.

Despite the advancement of speech recognition technology, speech recognition cannot yet be fully accomplished due to background noise or the like in an actual speech recognition environment. Thus, errors frequently occur in speech recognition tasks. In order to reduce the probability of the occurrence of such errors, there are employed methods of determining a final, recognized word depending on user confirmation or selection by requesting the user to confirm recognition results of a speech recognizer or by presenting the user with a list of alternative words derived from the recognition results of the speech recognizer.

Conventional techniques associated with the above methods are disclosed in U.S. Pat. Nos. 4,866,778, 5,027,406, 5,884,258, 6,314,397, 6,347,296, and so on. U.S. Pat. No. 4,866,778 suggests a technique by which the most effectively searched probable alternative word is displayed and if the probable alternative word is wrong, the next alternative word is displayed to find the correct recognition result. According to this technique, a user must separately answer a series of YES/NO questions presented by a speech recognition system and cannot predict which words will appear in the next question. U.S. Pat. Nos. 5,027,406 and 5,884,258 present a technique by which alternative words derived from speech recognition are arrayed and recognition results are determined depending on user's selections from the alternative words via a graphic user interface or voice. According to this technique, since the user must perform additional manipulations to select the correct alternative word in each case after he or she speaks, he or she experiences inconvenience and is tired of the iterative operations. U.S. Pat. No. 6,314,397 shows a technique by which a user's utterances are converted into texts based on the best recognition results and corrected through a user review during which an alternative word is selected from a list of alternative words derived from previously considered recognition results. This technique suggests a smooth speech recognition task. However, when the user uses a speech recognition system in real time, the user must create a sentence, viewing recognition results. U.S. Pat. No. 6,347,296 discloses a technique by which during a series of speech recognition tasks, an indefinite recognition result of a specific utterance is settled by automatically selecting an alternative word from a list of alternative words with reference to a recognition result of a subsequent utterance.

As described above, according to conventional speech recognition technology, although a correct recognition result of user speech is obtained, an additional task such as user confirmation or selection must be performed at least once. In addition, when the user confirmation is not performed, an unlimited amount of time is taken to determine a final, recognized word.

SUMMARY OF THE INVENTION

The present invention provides a speech recognition method of determining a first alternative word as a final, recognized word after a predetermined standby time in a case where a user does not select an alternative word from a list of alternative words derived from speech recognition of the user's utterance, determining a selected alternative word as a final, recognized word when the user selects the alternative word, or determining an alternative word selected after an adjusted standby time as a final, recognized word.

The present invention also provides an apparatus for performing the speech recognition method.

According to an aspect of the present invention, there is provided a speech recognition method comprising: inputting speech uttered by a user; recognizing the input speech and creating a predetermined number of alternative words to be recognized in order of similarity; and displaying a list of alternative words arranged in a predetermined order and determining an alternative word that a cursor currently indicates as a final, recognized word if a user's selection from the list of alternative words has not been changed within a predetermined standby time.

Preferably, but not required, the speech recognition method further comprises adjusting the predetermined standby time and returning to the determination whether the user's selection from the list of alternative words has been changed within the predetermined standby time, if the user's selection has been changed within the predetermined standby time. The speech recognition method further comprises determining an alternative word from the list of alternative words that is selected by the user as a final, recognized word, if the user's selection is changed within the predetermined standby time.

According to another aspect of the present invention, there is provided a speech recognition apparatus comprising: a speech input unit that inputs speech uttered by a user; a speech recognizer that recognizes the speech input from the speech input unit and creates a predetermined number of alternative words to be recognized in order of similarity; and a post-processor that displays a list of alternative words arranged in a predetermined order and determines an alternative word that a cursor currently indicates as a final, recognized word if a user's selection from the list of alternative words has not been changed within a predetermined standby time.

Preferably, the post-processor comprises: a window generator that generates a window for a graphic user interface comprising the list of alternative words; a standby time setter that sets a standby time from when the window is displayed to when the alternative word on the list of alternative words currently indicated by the cursor is determined as the final, recognized word; and a final, recognized word determiner that determines a first alternative word from the list of alternative words that is currently indicated by the cursor as a final, recognized word if the user's selection from the list of alternative words has not been changed within the predetermined standby time, adjusts the predetermined standby time if the user's selection from the list of alternative words has been changed within the predetermined standby time, and determines an alternative word on the list of alternative words selected by the user as a final, recognized word if the user's selection has not been changed within the adjusted standby time.

Preferably, but not required, the post-processor comprises: a window generator that generates a window for a graphic user interface comprising a list of alternative words that arranges the predetermined number of alternative words in a predetermined order; a standby time setter that sets a standby time from when the window is displayed to when an alternative word on the list of alternative words currently indicated by the cursor is determined as a final, recognized word; and a final, recognized word determiner that determines a first alternative word on the list of alternative words currently indicated by the cursor as a final, recognized word if a user's selection from the list of alternative words has not been changed within the standby time and determines an alternative word on the list of alternative words selected by the user as a final, recognized word if the user's selection from the list of alternative words has been changed.

BRIEF DESCRIPTION OF THE DRAWINGS

The above/or and other features and advantages of the present invention will become more apparent by describing in detail exemplary embodiments thereof with reference to the attached drawings in which.

DETAILED DESCRIPTION OF THE PREFERRED EMBODIMENTS

Hereinafter, embodiments of the present invention will be described in detail with reference to the attached drawings.

Figure 1:
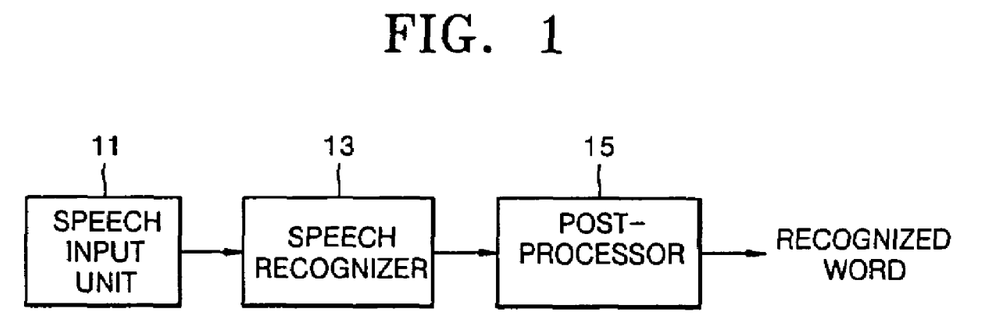
FIG. 1 is a block diagram of a speech recognition apparatus according to an embodiment of the present invention.

FIG. 1 is a block diagram of a speech recognition apparatus according to an embodiment of the present invention. Referring to FIG. 1, the speech recognition apparatus includes a speech input unit 11, a speech recognizer 13, and a post-processor 15.

The speech input unit 11 includes microphones and so forth, receives speech from a user, removes a noise signal from the user speech, amplifies the user speech to a predetermined level, and transmits the user speech to the speech recognizer 13.

The speech recognizer 13 detects a starting point and an ending point of the user speech, samples speech feature data from sound sections except soundless sections before and after the user speech, and vector-quantizes the speech feature data in real-time. Next, the speech recognizer 13 performs a viterbi search to choose the closest acoustic word to the user speech from words stored in a DB using the speech feature data. To this end, Hidden Markov Models (HMMs) may be used. Feature data of HMMs, which are built by training words, is compared with that of currently input speech and the difference between the two feature data is used to determine the most probable candidate word. The speech recognizer 13 completes the viterbi search, determines a predetermined number, for example, 3 of the closest acoustic words to currently input speech as recognition results in the order of similarity, and transmits the recognition results to the post-processor 15.

The post-processor 15 receives the recognition results from the speech recognizer 13, converts the recognition results into text signals, and creates a window for a graphic user interface. Here, the window displays the text signals in the order of similarity. An example of the window is shown in FIG. 9. As shown in FIG. 9, a window 91 includes a message area 92 for displaying a message "A first alternative word, herein, 'Tam Saek Gi', is being recognized", an area 93 for displaying a time bar, and an area 94 for displaying a list of alternative words. The window 91 is displayed on a screen until the time belt 93 corresponding to a predetermined standby time is over. In addition, in a case where there is no additional user input with an alternative word selection key or button within the standby time, the first alternative word is determined as a final, recognized word. On the contrary, when there is an additional user input with the alternative word selection key or button within the standby time, a final, recognized word is determined through a process shown in FIG. 7 or 8 which will be explained later.

Figure 2:
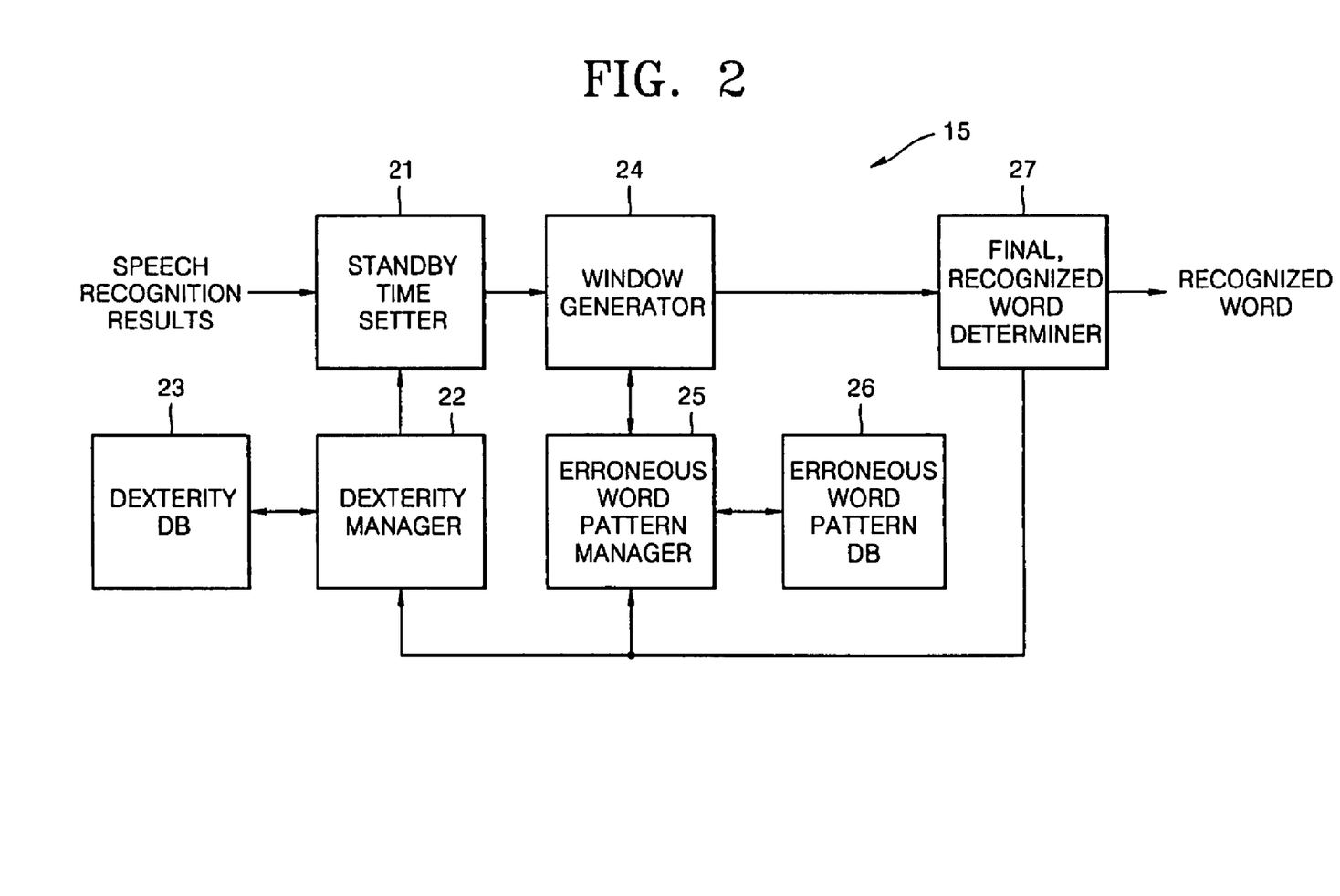
FIG. 2 is a detailed block diagram of a post-processor of FIG. 1.

FIG. 2 is a detailed block diagram of the post-processor 15 of FIG. 1. Referring to FIG. 2, the post-processor 15 includes a standby time setter 21, a dexterity manager 22, a dexterity DB 23, a window generator 24, an erroneous word pattern manager 25, an erroneous word pattern DB 26, and a final, recognized word determiner 27.

The standby time setter 21 sets a standby time from a point in time when the window 91 for the graphic user interface is displayed to a point in time when an alternative word currently indicated by a cursor is determined as a final, recognized word. The standby time is represented by the time bar 93 in the window 91. The standby time may be equally assigned to all of the alternative words on the list of alternative words. The standby time may also be assigned differentially to each of the alternative words from the most acoustically similar alternative word to the least acoustically similar alternative word. The standby time may be equally assigned to users or may be assigned differentially to the user depending on the user's dexterity at handling the speech recognition apparatus. The standby time setter 21 provides the window generator 24 with the standby time and the recognition results input from the speech recognizer 13.

The dexterity manager 22 adds a predetermined spare time to a selection time determined based on information on a user's dexterity stored in the dexterity DB 23, adjusts the standby time to the addition value, and provides the standby time setter 21 with the adjusted standby time. Here, the dexterity manager 22 adjusts the standby time through a process shown in FIG. 6 which will be explained later. In addition, the standby time may be equally assigned to all of the alternative words or may be assigned differentially to each of the alternative words from the most acoustically similar alternative word to the least acoustically similar alternative word.

The dexterity DB 23 stores different selection times determined based on the user's dexterity. Here, 'dexterity' is a variable in inverse proportion to a selection time required for determining a final, recognized word after the window for the graphic user interface is displayed. In other words, an average value of selection times required for a predetermined number of times a final, recognized word is determined as the user's dexterity.

The window generator 24 generates the window 91 including the message area 92, the time belt 93, and the alternative word list 94 as shown in FIG. 9. The message area 92 displays a current situation, the time belt 93 corresponds to the standby time set by the standby time setter 21, and the alternative word list 94 lists the recognition results, i.e., the alternative words, in the order of similarity. Here, the order of listing the alternative words may be determined based on erroneous word patterns appearing in previous speech recognition history as well as the similarity.

The erroneous word pattern manager 25 receives a recognized word determined as the first alternative word by the speech recognizer 13 and the final, recognized word provided by the final, recognized word determiner 27. If the erroneous word pattern DB 26 stores the combination of the recognized words corresponding to the first alternative word and the final, recognized word, the erroneous word pattern manager 25 adjusts scores of the recognition results supplied from the speech recognizer 13 via the standby time setter 21 and the window generator 24 to be provided to the window generator 24. The window generator 24 then changes the listing order of the alternative word list 94 based on the adjusted scores. For example, if "U hui-jin" is determined as the first alternative word and "U ri jib" is determined as the final, recognized word, predetermined weight is laid on "U ri jib". As a result, although the speech recognizer 13 determines "U hui jin" as the first alternative word, the window generator 24 can array "U ri jib" in a higher position than "U hui jin".

Figure 4:
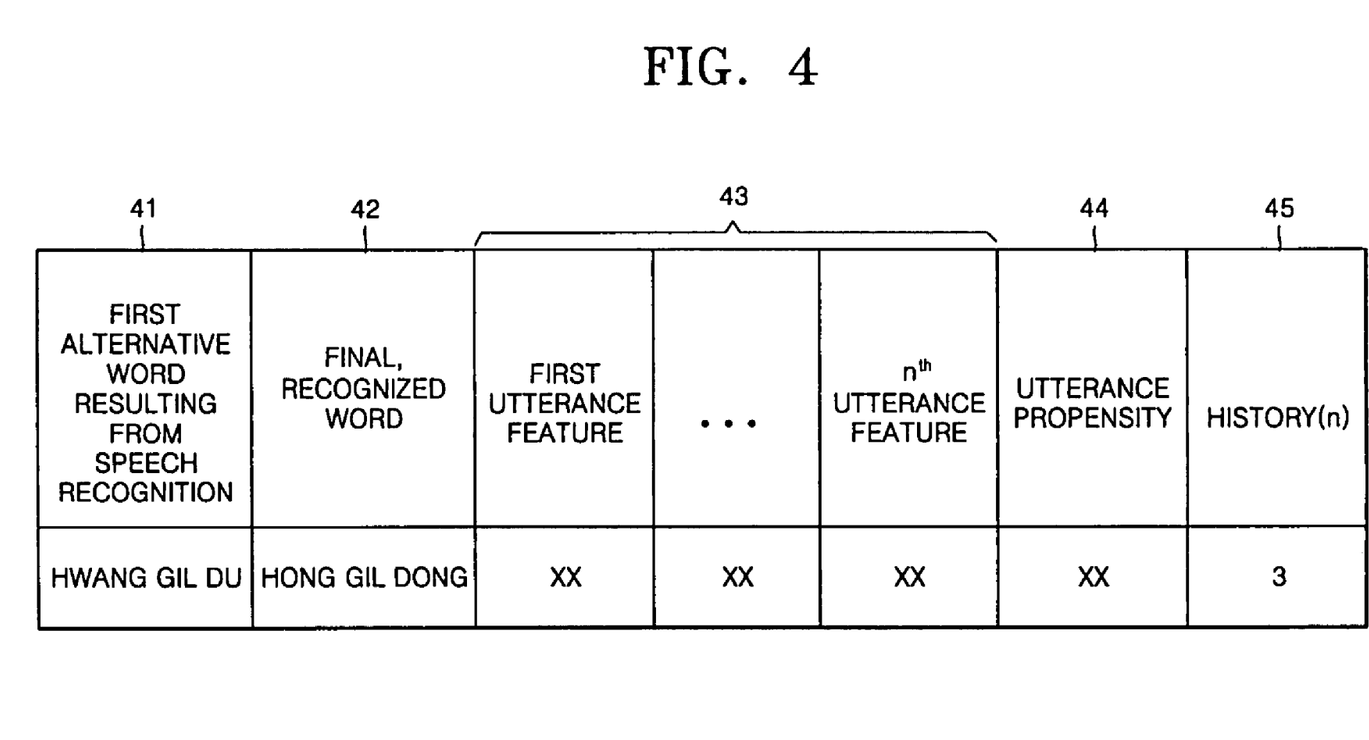
FIG. 4 is a table showing an example of the erroneous word pattern DB of FIG. 2.

When the first alternative word and the final, recognized word are different, the erroneous word pattern DB 26 stores the first alternative word and the final, recognized word as erroneous word patterns. As shown in FIG. 4, an erroneous word pattern table includes a first alternative word 41 resulting from speech recognition, a final, recognized word 42, first through nth user utterance features 43, an utterance propensity 43, and a number of times errors occur, i.e., a history n 45.

The final, recognized word determiner 27 determines the final, recognized word depending on whether the user makes an additional selection from the alternative word list 94 in the window 91 within the standby time represented by the time belt 93. In other words, when the user does not additionally press the alternative word selection key or button within the standby time after the window 91 is displayed, the final, recognized word determiner 27 determines the first alternative word currently indicated by the cursor as the final, recognized word. When the user presses the alternative word selection key or button within the standby time, the final, recognized word determiner 27 determines the final, recognized word through the process of FIG. 7 or 8.

Figure 3:
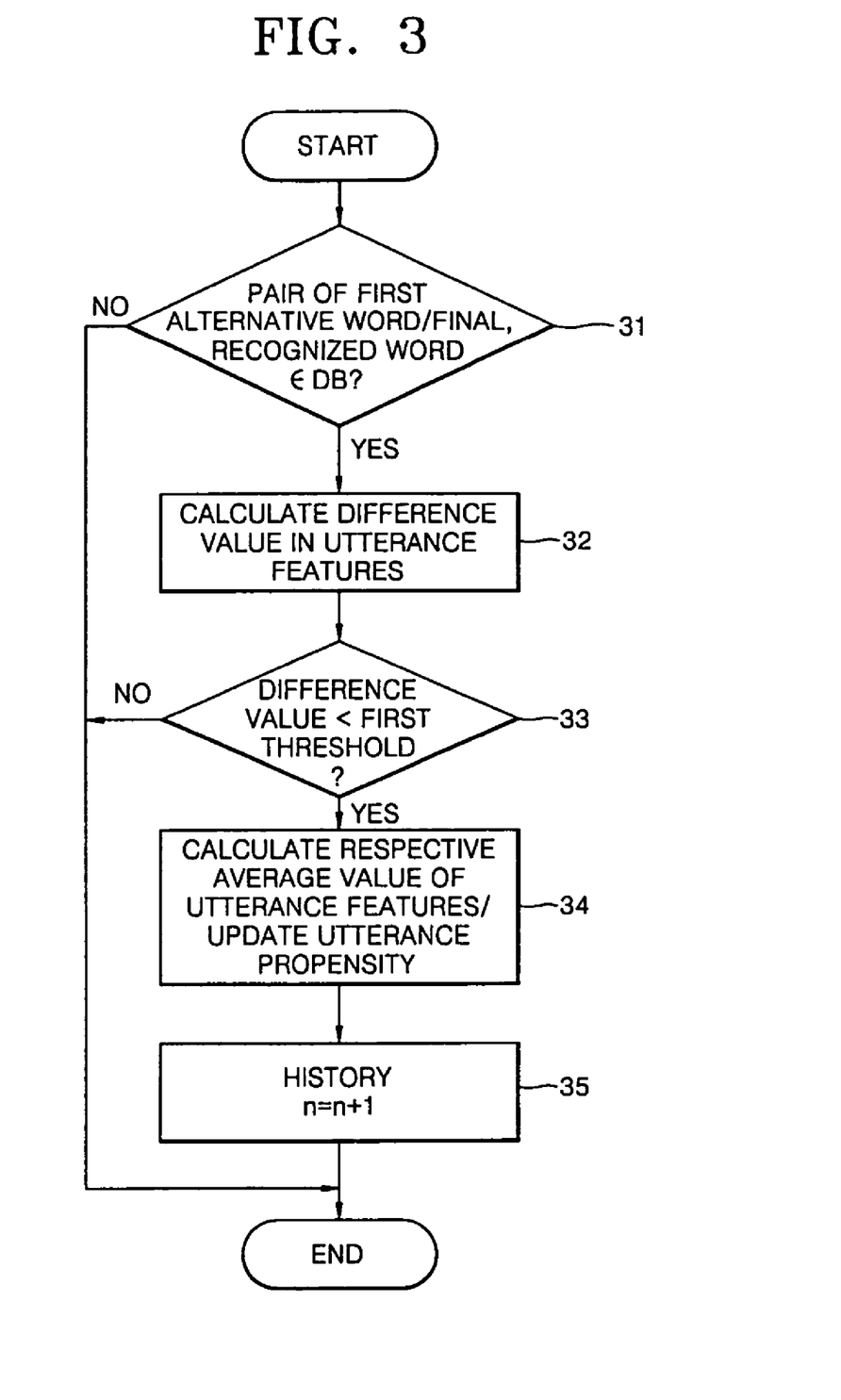
FIG. 3 is a flowchart for explaining a process of updating an erroneous word pattern database (DB) by an erroneous word pattern manager of FIG. 2.

FIG. 3 is a flowchart for explaining an updating process of the erroneous word pattern DB 26 by the erroneous word pattern manager 25 of FIG. 2. Referring to FIG. 3, in operation 31, a determination is made as to whether the erroneous word pattern DB 26 stores a pair of the first alternative word and the final, recognized word provided by the final, recognized word determiner 27. If in operation 301, it is determined that the erroneous word pattern DB 26 does not store the pair of the first alternative word and the final, recognized word, the process ends.

If in operation 31, it is determined that the erroneous word pattern DB 26 stores the pair of the first alternative word and the final, recognized word, in operation 32, a difference value in utterance features is calculated. The difference value is a value obtained by adding absolute values of differences between the first through nth utterance features 43 of the erroneous word patterns stored in the erroneous word pattern DB 26 and first through nth utterance features of currently input speech.

In operation 33, the difference value is compared with a first threshold, that is, a predetermined reference value for update. The first threshold may be set to an optimum value experimentally or through a simulation. If in operation 33, it is determined that the difference value is greater than or equal to the first threshold, the process ends. If in operation 33, the difference value is less than the first threshold, i.e., if it is determined that an error occurs for reasons such as a cold, voice change in the mornings, background noise, or the like, in operation 34, respective average values of the first through nth utterance features including those of the currently input speech are calculated to update the utterance propensity 44. In operation 35, a value of a history n is increased by 1 to update the history 45.

Figure 5:
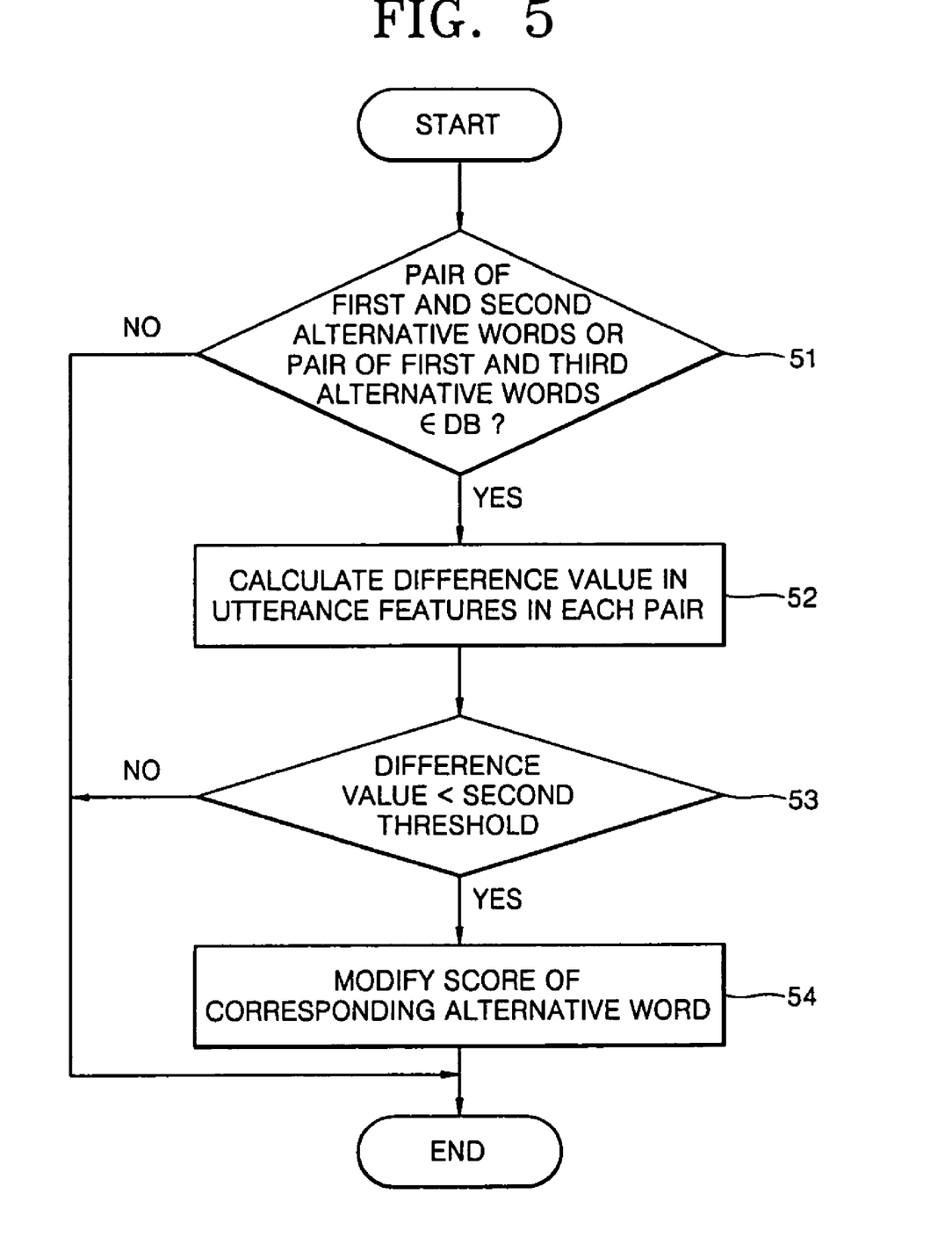
FIG. 5 is a flowchart explaining a process of changing the order of the arrangement of alternative words by the erroneous word pattern manager of FIG. 2.

FIG. 5 is a flowchart explaining a process of changing an order of listing alternative words via the erroneous word pattern manager 25 of FIG. 2. Referring to FIG. 5, in operation 51, a determination is made as to whether the erroneous word pattern DB 26 stores a pair of a first alternative word and a second alternative word as the final, recognized word or a pair of a first alternative word and a third alternative word as the final, recognized word, with reference to the recognition results and scores of Table 1 provided to the window generator 24 via the speech recognizer 13. If in operation 51, it is determined that the erroneous word pattern DB 26 does not store the pair of the first alternative word and the second alternative word or the pair of the first alternative word and the third alternative word, the process ends. Here, Table 1 shows scores of first to third alternate words.

TABLE 1

| Recognition Result | Scores |
| --- | --- |
| Hwang Gil Du | 10 |
| Hong Gi Su | 9 |
| Hong Gil Dong | 8 |

If in operation 51, it is determined that the erroneous word pattern DB 26 stores the pair of the first alternative word and the second alternative word or the pair of the first alternative word and the third alternative word, in operation 52, a difference value in first through $n^{th}$ utterance features is calculated. As described with reference to FIG. 3, the difference value is a value obtained by adding absolute values of differences between the first through $n^{th}$ utterance features stored in the erroneous word pattern DB 26 and first through n$^{th}$ utterance features of currently input speech, with regard to each pair.

In operation 53, the difference value is compared with a second threshold, that is, a predetermined reference value for changing the order of listing the alternative words. The second threshold may be set to an optimum value experimentally or through a simulation. If in operation 53, it is determined that the difference value in each pair is greater than or equal to the second threshold, i.e., an error does not occur for the same reason as the erroneous word pattern, the process ends. If in operation 53, it is determined that the difference value in each pair is less than the second threshold, i.e., the error occurs for the same reason as the erroneous word pattern, in operation 54, a score of a corresponding alternative word is adjusted. For example, in a case where the erroneous word pattern DB 26 stores an erroneous word pattern table as shown in FIG. 4, that is, the pair of the first alternative word and the third alternative word as a final, recognized word and the weight is set to 0.4, the recognition results and the scores shown in Table 1 are changed into recognition results and scores shown in Table 2. Here, a changed score "9.2" is obtained by adding a value resulting from multiplication of the weight "0.4" by a history "3" to an original score "8".

TABLE 2

| Recognition Result | Score |
| --- | --- |
| Hwang Gil Du | 10 |
| Hong Gi Su | 9.2 |
| Hong Gil Dong | 9 |

Meanwhile, the first through nth utterance features 43 used in the processes shown in FIGS. 3 through 5 are information generated when the speech recognizer 13 analyzes speech. In other words, the information may be information, a portion of which is used for determining speech recognition results and a remaining portion of which is used only as reference data. The information may also be measured using additional methods as follows.

First, a time required for uttering a corresponding number of syllables is defined as an utterance speed. Next, a voice tone is defined. When the voice tone is excessively lower or higher than a microphone volume set in hardware, the voice tone may be the cause of an error. For example, a low-pitched voice is hidden by noise and a high-pitched voice is not partially received by hardware. As a result, a voice signal may be distorted. Third, a basic noise level, which is measured in a state when no voice signal is input or in a space between syllables, is defined as a signal-to-noise ratio (SNR). Finally, the change of voice is defined in a specific situation where a portion of voice varies due to cold or a problem with the vocal chords that occurs in the mornings. In addition, various other utterance features may be used.

Figure 6:
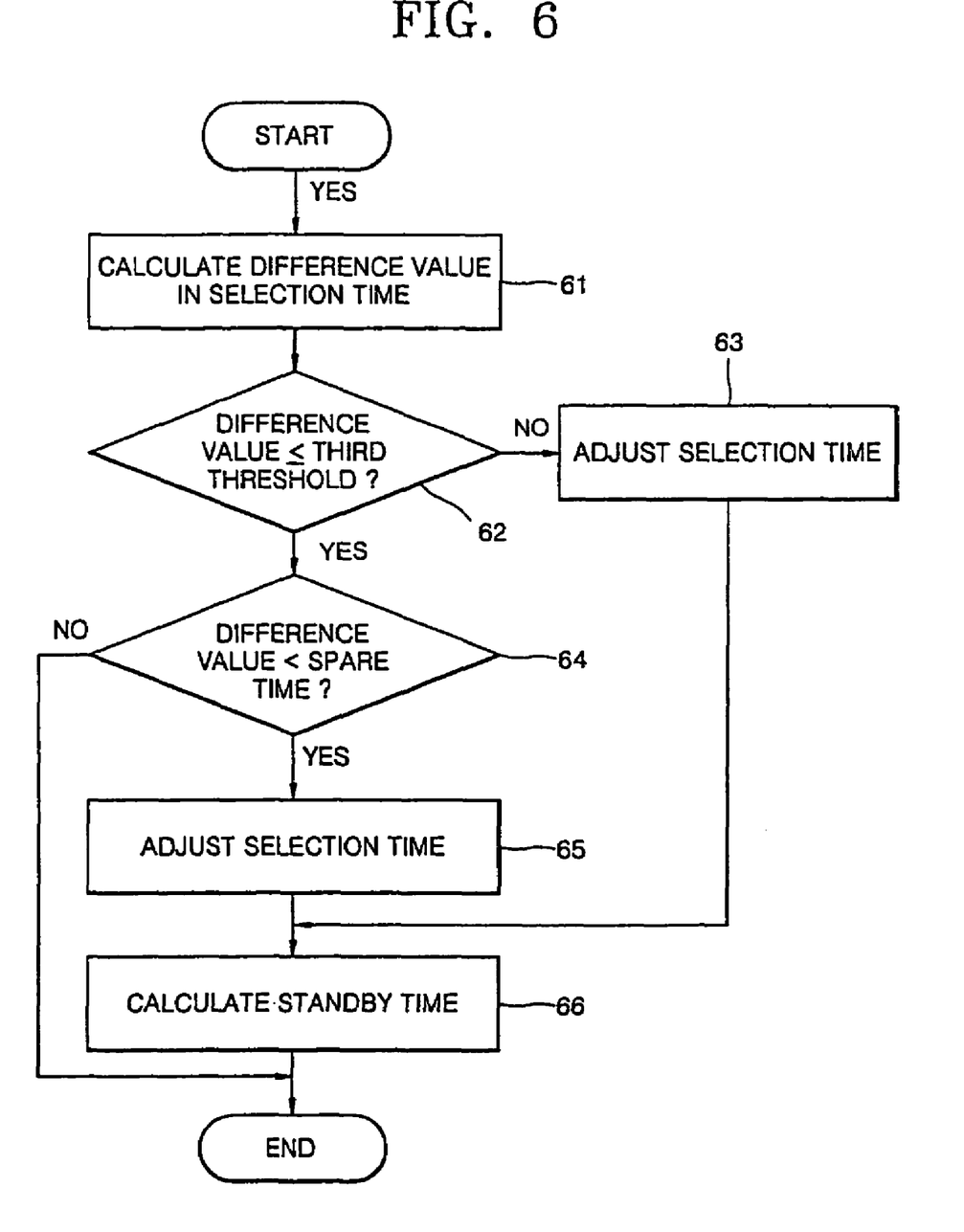
FIG. 6 is a flowchart explaining a process of adjusting a standby time by a dexterity manager of FIG. 2.

FIG. 6 is a flowchart explaining a process of adjusting the standby time via the dexterity manager 22 of FIG. 2. Referring to FIG. 6, in operation 61, a difference value in a selection time is calculated by subtracting a time required for determining a final, recognized word from the selection time assigned as an initialization value stored in the dexterity DB 23. In operation 62, the difference value is compared with a third threshold, that is, a predetermined reference value for changing the standby time. The third threshold may be set to an optimum value experimentally or through a simulation. If in operation 62, it is determined that the difference value is greater than the third threshold, i.e., a given time is longer than a time for which the user can determine a selection, in operation 63, the selection time is modified. The modified selection time is calculated by subtracting a value resulting from multiplying the difference value by the predetermined weight from the selection time stored in the dexterity DB 23. For example, when the selection time stored in the dexterity DB 23 is 0.8 seconds, the difference value is 0.1 seconds, and the predetermined weight is 0.1, the modified selection time is 0.79 seconds. The modified selection time is stored in the dexterity DB 23 so as to update a selection time for the user.

If in operation 62, it is determined that the difference value is less than or equal to the third threshold, i.e., a final user's selection is determined by a timeout of the speech recognition system after the selection time ends, in operation 64, the difference value is compared with a predetermined spare time. If in operation 64, it is determined that the difference value is greater than or equal to the spare time, the process ends.

If in operation 64, it is determined that the difference value is less than the spare time, in operation 65, the selection time is modified. The modified selection time is calculated by adding a predetermined extra time to the selection time stored in the dexterity DB 23. For example, when the selection time stored in the dexterity DB 23 is 0.8 seconds and the extra time is 0.02 seconds, the modified selection time is 0.82 seconds. The modified selection time is stored in the dexterity DB 23 so as to update a selection time for a user. The extra time is to prevent a potential error from occurring in a subsequent speech recognition process, and herein, is set to 0.02 seconds.

In operation 66, a standby time for the user is calculated by adding a predetermined amount of extra time to the selection time modified in operation 63 or 65, and the standby time setter 21 is informed of the calculated standby time. Here, the extra time is to prevent a user's selection from being determined regardless of the user's intension, and herein, is set to 0.3 seconds.

Figure 7:
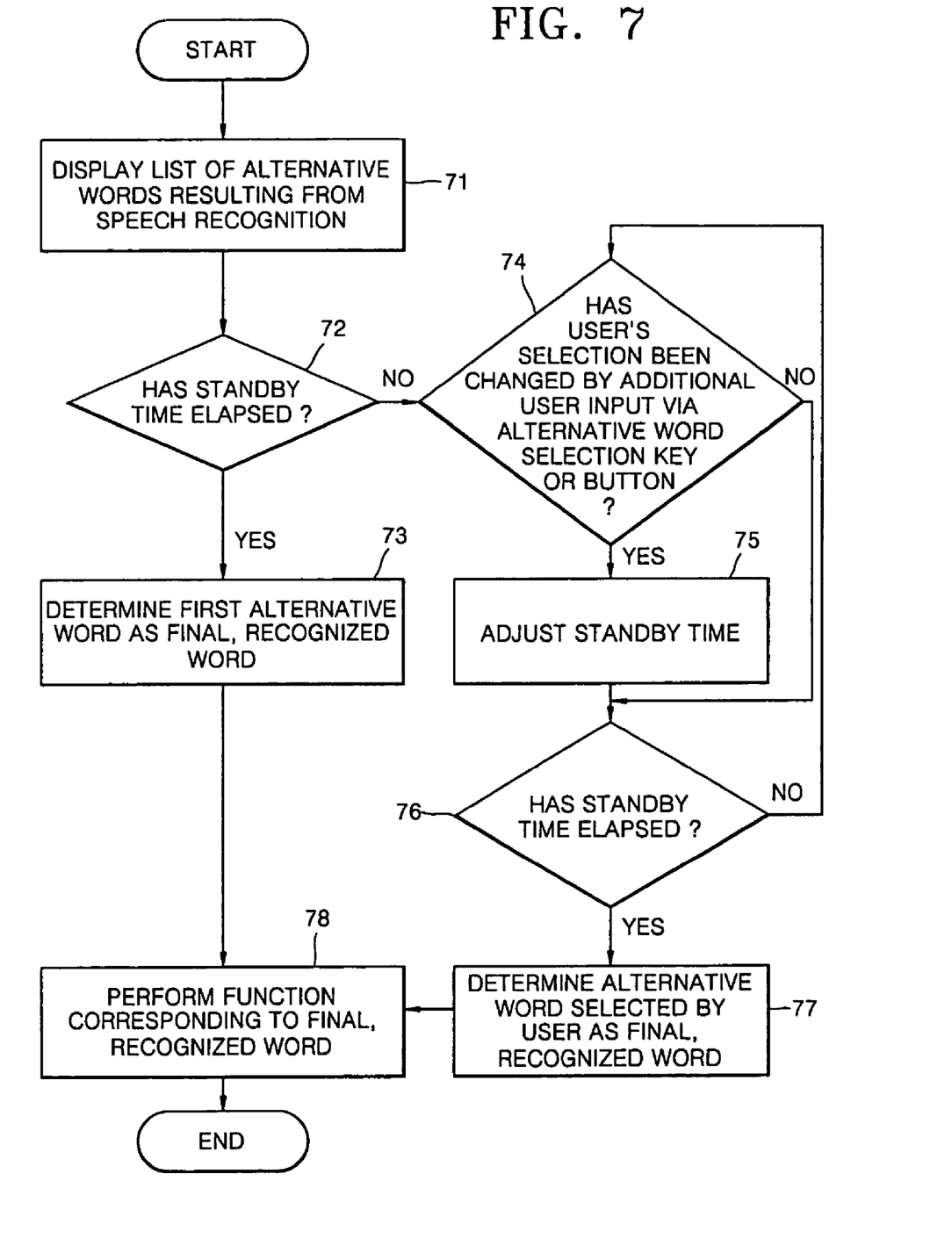
FIG. 7 is a flowchart explaining a speech recognition method, according to an embodiment of the present invention.

FIG. 7 is a flowchart for explaining a speech recognition method, according to an embodiment of the present invention. The speech recognition method includes operation 71 of displaying a list of alternative words, operations 72, 73, and 78 performed in a case of no change in a user's selection, and operations 74, 75, 76, and 77 performed in a case where a user's selection changes.

Referring to FIG. 7, in operation 71, the window 91 including the alternative word list 94 listing the recognition results of the speech recognizer 13 is displayed. In the present invention, the cursor is set to indicate the first alternative word on the alternative word list 94 when the window 91 is displayed. In addition, the time belt 93 starts from when the window 91 is displayed. In operation 72, a determination is made as to whether an initial standby time set by the standby time setter 21 has elapsed without additional user input with the alternative word selection key or button.

If in operation 72, it is determined that the initial standby time has elapsed, in operation 73, a first alternative word currently indicated by the cursor is determined as a final, recognized word. In operation 78, a function corresponding to the final, recognized words is performed. If in operation 72, it is determined that the initial standby time has not elapsed, in operation 74, a determination is made as to whether a user's selection has been changed by the additional user input with the alternative word selection key or button.

If in operation 74, it is determined that the user's selection has been changed, in operation 75, the initial standby time is reset. Here, the adjusted standby time may be equal to or different from the initial standby time according to an order of listing the alternative words. If in operation 74, it is determined that the user's selection has not been changed, the process moves on to operation 76. For example, if the user's selection is changed into 'Tan Seong Ju Gi' shown in FIG. 9, the message area 92 of the window 91 shows a message "The present invention, in respect to success rates of speech recognition tasks and a number of times an additional task is performed in various recognition environments.

TABLE 3

| Suggestion Method of Alternative Word | 90% Recognition Environment | | | | 70% Recognition Environment | | | |
|---|---|---|---|---|---|---|---|---|
| | Additional Task 0 Time | Additional Task 1 Time | Additional Task 2 Time | Total | Additional Task 0 Time | Additional Task 1 Time | Additional Task 2 Time | Total |
| Existing method 1 | 90% | 0% | 0% | 90% | 70% | 0% | 0% | 70% |
| Existing method 2 | 0% | 90% | 0% | 90% | 0% | 70% | 0% | 70% |
| Existing method 3 | 0% | 99.9% | 0% | 99.9% | 0% | 97.3% | 0% | 97.3% |
| Present Invention | 90% | 9% | 0.9% | 99.9% | 70% | 21% | 6.3% | 97.3% |

'Tan Seong Ju Gi' is being recognized" and concurrently, the time belt 93 starts according to the adjusted standby time.

In operation 76, a determination is made as to whether the standby time adjusted in operation 75 or the initial standby time has elapsed. If in operation 76, it is determined that the adjusted standby time or the initial standby time has not elapsed, the process returns to operation 74 to iteratively determine whether the user's selection has been changed. If in operation 76, it is determined that the adjusted standby time or the initial standby time has elapsed, in operation 77, an alternative word that the cursor currently indicates from a change in the user's selection is determined as a final, recognized word. In operation 78, a function corresponding to the final, recognized word is performed.

Figure 8:
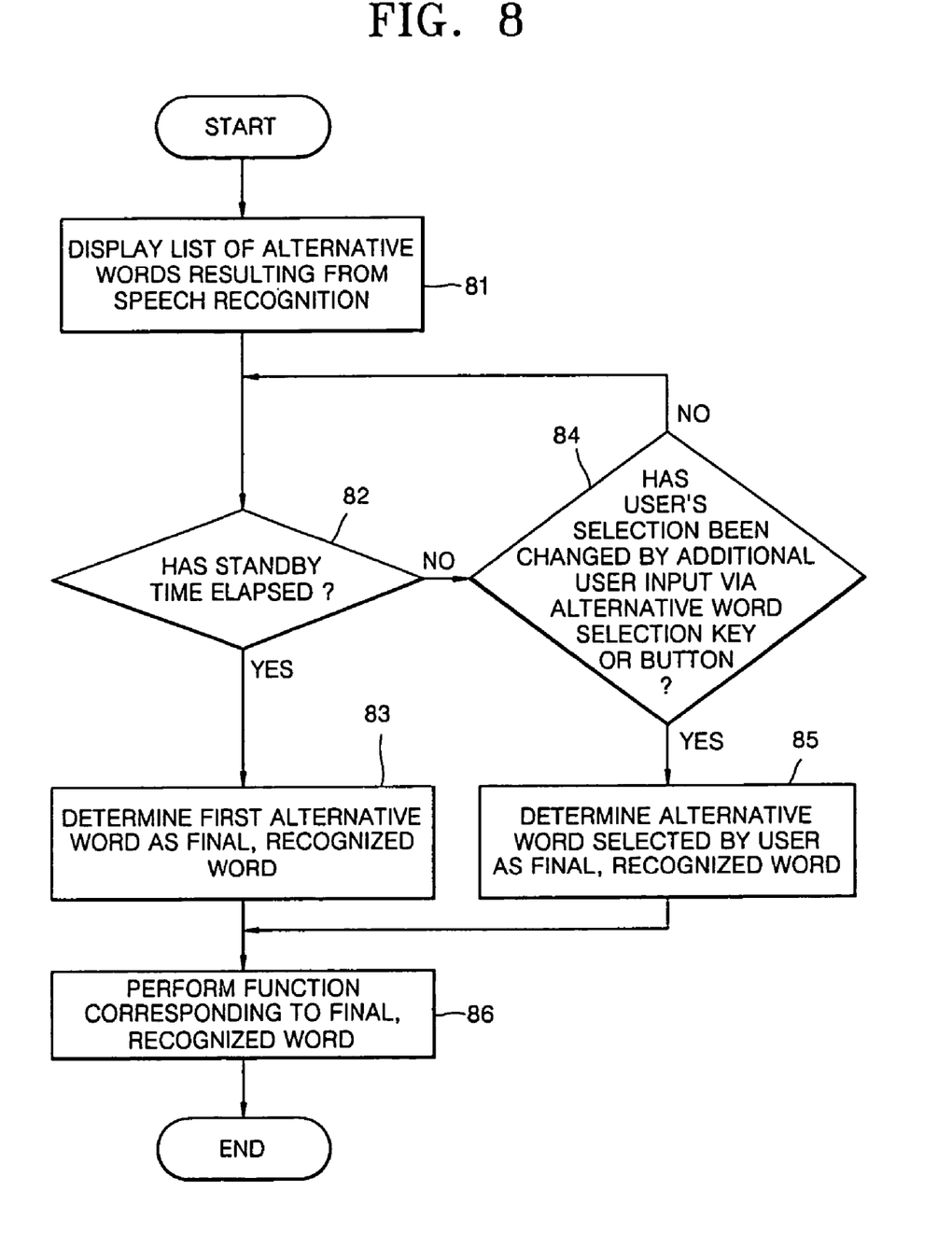
FIG. 8 is a flowchart explaining a speech recognition method, according to another embodiment of the present invention.
Figure 9:
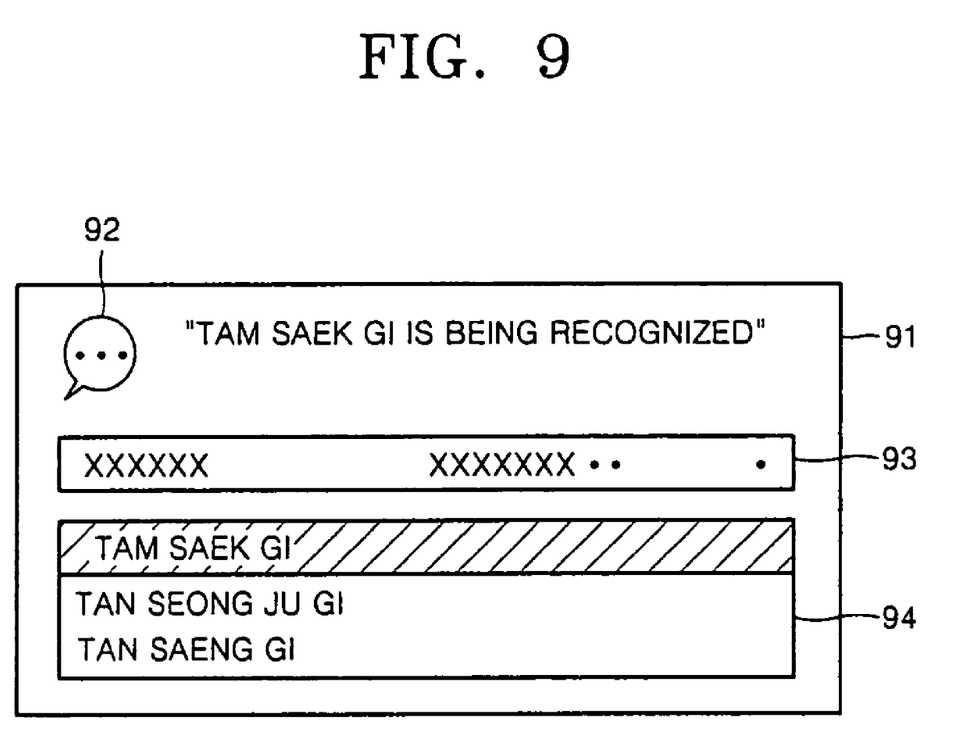
FIG. 9 shows an example of a graphic user interface according to the present invention.

FIG. 8 is a flowchart for explaining a speech recognition method, according to another embodiment of the present invention. The speech recognition method includes operation 81 of displaying a list of alternative words, operations 82, 83, and 86 performed in a case where there is no change in a user's selection, and operations 84, 85, and 86 performed in a case where there is a change in a user's selection.

Referring to FIG. 8, in operation 81, the window 91 including the alternative word list 94 listing the recognition results of the speech recognizer 13 is displayed. The time belt 93 starts from when the window 91 is displayed. In operation 82, a determination is made as to whether an initial standby time set by the standby time setter 21 has elapsed without an additional user input via the alternative word selection key or button.

If in operation 82, it is determined that the initial standby time has elapsed, in operation 83, a first alternative word currently indicated by the cursor is determined as a final, recognized word. In operation 86, a function corresponding to the final, recognized word is performed. If in operation 82, it is determined that the initial standby time has not elapsed, in operation 84, a determination is made as to whether a user's selection has been changed by the additional user input via the alternative word key or button. If in operation 84, it is determined that the user's selection has been changed, in operation 85, an alternative word that the cursor currently indicates due to the change in the user's selection is determined as the final, recognized word. In operation 86, a function corresponding to the final, recognized word is performed. If in operation 84, it is determined that the user's selection has not been changed, the process returns to operation 82.

Table 3 below shows comparisons of existing speech recognition methods and a speech recognition method of the Alternative words are suggested in existing method 1. In existing method 2, a user determines the best alternative word. In existing method 3, a user selects an alternative word from a list of alternative words corresponding to recognition results. Also, data shown in Table 3 was obtained on the assumption that 90% recognition environment refers to noise in an office, 70% recognition environment refers to noise where a car travels on a highway, and a list of alternative words to be recognized is infinite, the alternative words on the list of alternative words are similar. According to Table 3, when the speech recognition method of the present invention is adopted, as the additional task is iteratively performed, the success rate of the speech recognition task is maximized.

As described above, in a speech recognition method and apparatus according to the present invention, a number of times a user performs an additional task and psychological pressure placed on the user can be minimized, even in a poor speech recognition environment, and a final success rate of speech recognition performed via a voice command can be maximized. As a result, efficiency of speech recognition can be improved.

In addition, when a user's selection is not changed within a predetermined standby time, a subsequent task can be automatically performed. Thus, a number of times the user manipulates a button for speech recognition can be minimized. As a result, since the user can easily perform speech recognition, user satisfaction of a speech recognition system can be increased. Moreover, a standby time can be adaptively adjusted to a user. Thus, a speed for performing speech recognition tasks can be reduced.

The present invention can be realized as a computer-readable code on a computer-readable recording medium. For example, a speech recognition method can be accomplished as first and second programs recorded on a computer-readable recording medium. The first program includes recognizing speech uttered by a user and displaying a list of alternative words listing a predetermined number of recognition results in a predetermined order. The second program includes determining whether a user's selection from the list of alternative words has changed within a predetermined standby time; if the user's selection has not changed within the predetermined standby time, determining an alternative word from the list of the alternative words currently indicated by a cursor, as a final, recognized word; if the user's selection has been changed within the predetermined standby time, the standby time is adjusted; iteratively determining whether the user's selection has changed within the adjusted standby time; and if the user's selection has not changed within the adjusted standby time, determining an alternative word selected by the user as a final, recognized word. Here, the second program may be replaced with a program including determining whether a user's selection from a list of alternative words has changed within a predetermined standby time; if the user's selection has not changed within the predetermined standby time, determining an alternative word from the list of alternative words currently indicated by a cursor, as a final, recognized word; and if the user's selection has been changed within the predetermined standby time, determining an alternative word selected by the user as a final, recognized word.

Examples of such computer-readable media devices include ROMs, RAMs, CD-ROMs, magnetic tapes, floppy discs, and optical data storing devices. Also, the computer-readable code can be stored on the computer-readable media distributed in computers connected via a network. Furthermore, functional programs, codes, and code segments for realizing the present invention can be easily analogized by programmers skilled in the art.

Moreover, a speech recognition method and apparatus according to the present invention can be applied to various platforms of personal mobile communication devices such as personal computers, portable phones, personal digital assistants (PDA), and so forth. As a result, success rates of speech recognition tasks can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A speech recognition method comprising:
   inputting speech uttered by a user;
   recognizing the input speech and displaying a list of a predetermined number of alternative words including a first alternative word to be recognized in an order of similarity; and
   determining, using at least one processing device, the first alternative word that a cursor currently indicates as a final, recognized word if a user selection has not been changed within a predetermined standby time.

2. The speech recognition method of claim 1, further comprising:
   adjusting the predetermined standby time if the user selection from the list of the alternative words has been changed within the standby time.

3. The speech recognition method of claim 1, further comprising:
   determining another alternative word from the list of the predetermined number of alternative words that is selected by the user as the final, recognized word, if the user's selection is changed within the standby time.

4. The speech recognition method of claim 1, wherein the determination further comprises:
   updating erroneous word patterns using the one of the alternative words and the final, recognized word resulting from the recognition of the speech; and
   adjusting the order of the list of the predetermined number of alternative words using the erroneous word patterns.

5. The speech recognition method of claim 4, wherein the updating of erroneous word patterns comprises:
   calculating a difference value in at least one utterance feature if a predetermined erroneous word pattern database stores the one alternative word and the final, recognized word resulting from the recognition of the speech;
   comparing the difference value with a first threshold; and
   calculating an average value of the utterance feature including that of currently input speech to update an utterance propensity and increasing a value of a history of a corresponding erroneous word pattern by 1 to update the history, if the difference value is smaller than the first threshold.

6. The speech recognition method of claim 4, wherein the adjustment of the predetermined order comprises:
   calculating a difference value in utterance features if a predetermined erroneous word pattern database stores at least one of a pair of the one alternative words and a second alternative word and a pair of the one alternative word and a third alternative word derived from the recognition of the speech;
   comparing the difference value with a second threshold in each pair; and
   modifying a score of a corresponding alternative word if the difference value is smaller than the second threshold.

7. The speech recognition method of claim 6, wherein the modified recognition score is calculated by adding a value resulting from multiplication of an original score by a history value of the corresponding alternative word by a predetermined weight.

8. The speech recognition method of claim 1, further comprising adjusting the standby time according to user dexterity.

9. The speech recognition method of claim 8, wherein the adjusting of the standby time according to the user dexterity comprises:
   calculating a difference value in a selection time by subtracting a determining time for the final, recognized word from a predetermined selection time stored in a dexterity database;
   comparing the difference value in the selection time with a third threshold;
   modifying the selection time if the difference value in the selection time is greater than the third threshold;
   comparing the difference value in the selection time with a predetermined spare time if the difference value in the selection time is less than or equal to the third threshold;
   modifying the selection time if the difference value in the selection time is less than the spare time; and
   calculating a standby time by adding a predetermined extra time to the modified selection time.

10. The speech recognition method of claim 9, wherein in the modification of the selection time if the difference value in the selection time is greater than the third threshold, the selection time is modified by subtracting a value resulting from multiplication of the difference value in the selection time by a predetermined weight from the selection time stored in the dexterity database.

11. The speech recognition method of claim 9, wherein in the modification of the selection time if the difference value in the selection time is less than the spare time, the selection time is modified by adding a predetermined extra time to the selection time stored in the dexterity database.

12. The speech recognition method of claim 1, wherein the standby time is equally assigned to all of the alternative words on the list of alternative words.

13. The speech recognition method of claim 1, wherein the standby time is assigned differentially to each of the alternative words on the list of alternative words according to the predetermined order of listing the alternative words.

14. A computer-readable recording medium structure comprising processing instructions to control a processor to execute a speech recognition method, the method comprising:

recognizing speech uttered by a user and displaying a list of alternative words including a first alternative word, derived from the recognition of the speech in a predetermined order; and     determining whether a user selection from the list of alternative words has been changed within a predetermined standby time and determining the first alternative word on the list of alternative words that a cursor currently indicates, as the final, recognized word, if the user selection has not been changed.

15. The computer-readable recording medium structure of claim 14, wherein the determining further comprises:

adjusting the standby time if the user selection has been changed within the predetermined standby time;

determining whether the user selection has been changed within the adjusted standby time; and     determining the alternative word on the list of alternative words selected by the user as the final, recognized word in response to determining that the user selection has not been changed within the adjusted standby time.

16. The computer-readable recording medium structure of claim 14, wherein the determining further comprises:

determining another alternative word on the list of alternative words selected by the user as the final, recognized word if it is determined that the user selection has been changed within the predetermined standby time.

17. A speech recognition apparatus comprising:

a speech input unit that inputs speech uttered by a user;

a speech recognizer that recognizes the speech input from the speech input unit and creates a list of alternative words including a first alternative word, to be recognized in an order of similarity; and     a post-processor that determines the first alternative word that a cursor currently indicates as a final, recognized word, if a user selection from a list of the alternative words has not been changed within a predetermined standby time.

18. The speech recognition apparatus of claim 17, wherein the post-processor comprises:

a window generator that generates a window for a graphic user interface comprising a list of alternative words that arranges the predetermined number of alternative words in a predetermined order;

a standby time setter that sets a standby time from when the window is displayed to when one of the alternative words on the list of alternative words currently indicated by the cursor is determined as a final, recognized word; and     a final, recognized word determiner that determines the one of the alternative words on the list of alternative words currently indicated by the cursor as the final, recognized word if a user selection from the list of alternative words has not been changed within the standby time and determines another alternative word on the list of alternative words selected by the user as the final, recognized word if the user's selection from the list of alternative words has been changed.

19. The speech recognition apparatus of claim 17, wherein the post-processor comprises:

a window generator that generates a window for a graphic user interface comprising the list of alternative words;

a standby time setter that sets a standby time from when the window is displayed to when the alternative word on the list of the alternative words currently indicated by the cursor is determined as the final, recognized word; and     a final, recognized word determiner that determines the one of the alternative words from the list of the alternative words that is currently indicated by the cursor as the final, recognized word if the user's selection from the list of the alternative words has not been changed within the predetermined standby time, adjusts the predetermined standby time if the user's selection from the list of the alternative words has been changed within the predetermined standby time, and determines the one of the alternative words on the list of the alternative words selected by the user as the final, recognized word if the user's selection has not been changed within the adjusted standby time.

20. The speech recognition apparatus of claim 18, wherein the post-processor further comprises:

an erroneous word pattern database that stores information of a recognized word determined as the one alternative word by the speech recognizer, the final, recognized word provided by the final, recognized word determiner, at least one user utterance feature, a utterance propensity, and a history; and     an erroneous word pattern manager that receives recognition results and scores from the speech recognizer, adjusts a score of a recognized word corresponding to an erroneous word pattern, and informs the window generator of the adjusted score so as to change the order of listing the alternative words.

21. The speech recognition apparatus of claim 18, wherein the post-processor further comprises:

a dexterity database that stores a selection time on the user dexterity; and     a dexterity manager that adjusts the standby time to a value obtained by adding a predetermined spare time to the selection time stored in the dexterity database and informs the standby time setter of the adjusted standby time.

22. The speech recognition apparatus of claim 18, wherein the post-processor further comprises:

a dexterity database that stores a selection time on the user dexterity; and     a dexterity manager that adjusts the standby time to a value obtained by adding a predetermined spare time to the selection time stored in the dexterity database and informs the standby time setter of the adjusted standby time.

23. The speech recognition apparatus of claim 18, wherein the standby time is determined depending on the dexterity of the user.

24. The speech recognition apparatus of claim 18, wherein the adjusted standby time is equally assigned to all of the alternative words on the list of alternative words.

25. The speech recognition apparatus of claim 18, wherein the adjusted standby time is assigned differentially to each of the alternative words on the list of alternative words according to an order of listing of the alternative words on the list of the alternative words.

26. A speech recognition method comprising:

displaying a list of alternative words, including a first alternative word, resulting from speech recognition;

determining whether an initial standby time has elapsed; and     determining, using at least one processing device, the first alternative word as the final, recognized word if a user has not selected another alternative word from the list of alternative words after the predetermined standby time has elapsed, wherein the list of alternative words is continuously updated and arranged in a predetermined order by computing a number of times the first alternative word and the final recognized word match.

27. The speech recognition method of claim 26, wherein the updating of the list of alternative words comprises:

calculating a difference value in at least one utterance feature if a predetermined erroneous word pattern database stores a pair of the first alternative word and the final, recognized word resulting from the recognition of the speech;

comparing the difference value with a first threshold; and calculating an average value of the utterance feature including that of currently input speech to update an utterance propensity and increasing a value of a history of a corresponding erroneous word pattern by 1 to update the history, if the difference value is smaller than the first threshold.

28. The speech recognition method of claim 26, wherein the adjustment of the predetermined order comprises:

calculating a difference value in utterance features if a predetermined erroneous word pattern database stores at least one of a pair of first and second alternative words and a pair of first and third alternative words derived from the recognition of the speech;

comparing the difference value with a second threshold in each pair; and modifying a score of a corresponding alternative word if the difference value is smaller than the second threshold.

29. The speech recognition method of claim 28, wherein the modified recognition score is calculated by adding a value resulting from multiplication of an original score by a history value of the corresponding alternative word by a predetermined weight.

\* \* \* \* \*